United States Patent Office 3,121,409
Patented Feb. 18, 1964

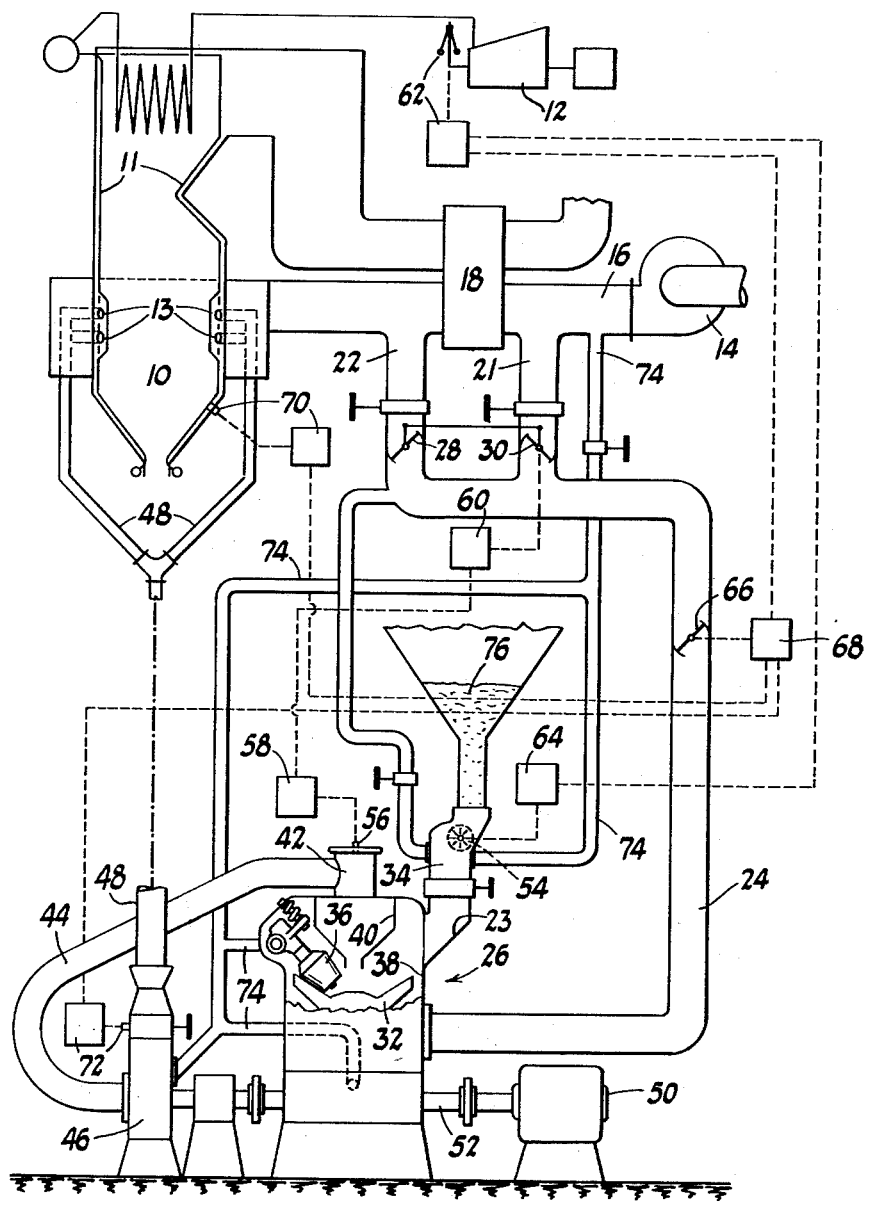

3,121,409
METHOD AND APPARATUS FOR CONTROLLING THE AIR SUPPLY TO A PULVERIZED COAL FIRING SYSTEM
Alexander Bogot, West Hartford, Conn., assignor to Combustion Engineering, Inc., Windsor, Conn., a corporation of Delaware
Filed Dec. 27, 1961, Ser. No. 162,480
3 Claims. (Cl. 110—106)

This invention relates generally to firing processes and systems for pulverized coal and has particular relation to a pressure firing process and system utilizing an air swept pulverizing mill.

In pulverized coal firing systems of the pressurized type wherein the furnace into which the pulverized coal is introduced and burned is operated at a pressure substantially above atmospheric it has been the practice when employing air swept pulverizers to utilize a fan or blower upstream of the pulverizer as a pressurized air source with the capacity of the blower being sufficient to provide a pressure head that is adequate to force the primary air, or mill air, through the mill and on into the furnace and with fan being specifically and solely for the purpose of providing a high pressure stream of mill air which, with the system employed, would necessarily have to have a pressure capability much higher than that of the secondary air source. In addition to this fan it is further necessary with this prior system to provide a sealing fan to develop a still higher pressure in order to seal the various journals of the pulverizing mill and the feeder which is connected with the mill. Since the air that is delivered to the mill is hot air in order that drying may take place in the mill the fan that forces air through the mill must handle this relatively high temperature air and in addition must handle air of varying temperatures since the temperature of the air delivered to the mill will vary with the mill loading and with the moisture content of the coal supplied to the mill.

As contrasted with this known system the present invention provides a pressurized, pulverized coal firing process and system wherein the mill operates at a substantially reduced pressure over that heretofore encountered and wherein the fan which forms part of the system may be of a very much reduced pressure head capability, merely acting as a booster fan with this fan handling a relatively constant temperature air-pulverized coal mixture and which temperature is substantially lower than that of the previously mentioned fan employed in prior pressurized systems.

Since the mill operates at a substantially lower pressure the sealing problem is greatly reduced and it is not necessary to employ a separate fan for producing the pressure required of the sealing air, since this air may be taken from the already available air system.

In accordance with the system of the invention there is provided a furnace which forms part of a vapor generator and which is operated at a pressure substantially above atmosphere or in other words is pressure fired. A stream of secondary air is provided by means of a forced draft fan at a pressure sufficiently high to force the same through the connecting duct work and an air heater and introduce it into the furnace as secondary, combustion supporting air at a desired velocity. At locations both before and after the air heater, air is withdrawn from this pressurized stream of air and these withdrawn hot and cold air streams are mixed to form a stream of heated mill air for an air swept pulverizer and which air is also the primary combustion supporting air and conveying air within which the fuel is entrained. This mill air is conveyed directly to the air swept pulverizing mill which forms part of the firing system, with the air passing through the mill and in contact with the pulverized coal, drying the coal and entraining a portion of the pulverized coal therein. This stream of air with pulverized coal entrained therein is conveyed from the pulverizer to a booster fan where its pressure is raised sufficiently to overcome the resistance of the conveying system and for introduction into the furnace and with this coal-air mixture being conveyed from this booster fan to the furnace where it is introduced thereinto and burned. Sealing air for the pulverizer, which is operated at superatmospheric pressure, is supplied from the pressurized air stream upstream of the air heater. The temperature of the mill air supplied to the mill is controlled by adjustably proportioning the air withdrawn before and after the air heater from the pressurized supply of air with this proportioning being controlled in response to the temperature of the air-coal mixture leaving the mill.

The supply of air to the mill is regulated by means of a damper which is suitably adjusted so as to control the quantity of the heated stream of air directed into the mill so that it is in the correct proportion with regard to the coal supplied to the mill.

It is an object of this invention to provide an improved pressurized, pulverized coal firing process and system.

A still further object of this invention is to provide such an improved process and system which has a relatively low power requirement.

A still further object of the invention is to provide such a pressurized, pulverized coal firing process and system wherein the pressurized system required for supplying combustion supporting air to the pressurized furnace is utilized in an optimum fashion to supply pressurized air to the pulverizing mill of the firing system and in a manner providing a simplified and efficient operation and arrangement.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

FIG. 1 is a schematic representation of a firing system incorporating the present invention and as employed with a vapor generator.

Referring now to the drawing, wherein like reference characters are used throughout to designate like elements the illustrative and preferred embodiment of the invention includes a furnace 10 which is pressure fired so that the pressure within the furnace is substantially above atmospheric. The furnace has its walls lined with heat exchange tubes 11 and the furnace forms part of a vapor generator which generates vapor that is supplied to the turbine 12 with this turbine in turn being connected to a variable load, such as an electric generator.

The firing system for the furnace is effective to produce a stream of pulverized coal entrained in air with this stream of coal and air being introduced into the furnace. The air within which the stream of coal is entrained is the primary combustion supporting air and in addition to this air there is supplied to the furnace secondary combustion supporting air with this secondary air being introduced into the furnace in close proximity of the pulverized coal-air stream and with the quantity of secondary air being substantially greater than that of the primary air.

In a pressurized, pulverized coal firing system a forced draft fan is employed which introduces the secondary combustion supporting air into the furnace at a sufficient pressure that the furnace interior is operating at a pressure substantially above atmospheric with the pressure being sufficient so that gases are forced through the furnace and gas passageways that extend from the furnace on into the stack which discharges the gases to the atmosphere.

In the illustrative organization, forced draft fan 14 creates a pressurized source or steam of air which passes through the duct 16 with this duct being connected at its downstream end to the furnace to introduce secondary combustion supporting air thereinto through burners such as 13. Connected into this duct 16 is air heater 18 which receives as its heat source the combustion gases generated in the furnace prior to these gases being discharged to the stack.

The supply of air for the air swept pulverizing mill 26 which forms part of the pressurized firing system of the invention is obtained from the pressurized air source in duct 16. For this purpose there are provided ducts 21 and 22 which connected with the duct 16 upstream and downstream, respectively, of air heater 18 and which are connected at their outlets with duct 24 which leads to and is connected with the air swept pulverizer 26. Duct 22 receives hot air, such as 650° F., while duct 22 receives cold air, such as room temperature, with these two air streams being mixed or united and introduced into the duct 24. In order to control the temperature of the air passing through the duct 24 dampers 28 and 30 are positioned in the ducts 22 and 21, respectively, and are operated to controllably proportion the hot and cold air introduced to the duct 24 and thereby regulate the temperature of the mill air stream at the outlet of the mill.

The mill air, which is introduced into the air swept pulverizing mill 26 from duct 24 passes, upwardly therethrough, in the illustrative organization, and egresses from the upper end thereof with pulverized coal entrained in this egressing air.

In the illustrative system shown in the drawing the air swept pulverizer 26 comprises a bowl mill such as disclosed in U.S. Patent 2,848,170 of August 19, 1958 and includes a rotating bowl 32 into which the coal feed from the feeder is introduced with there being provided a number of grinding rolls 36 which are pivotally mounted and are urged toward the outer portion of the bowl so that a grinding action takes place on the material between these rollers and this bowl portion. These pivotally mounted rollers are urged by adjustable spring means towards this outer bowl portion. The heated stream of air from duct 24 passes upwardly between the mill housing 38 and the rim of the bowl and as it passes upwardly past the bowl, pulverized coal is entrained in this air with this air-coal mixture passing up into the classifier 40 in the upper part of the mill. This classifier is effective to separate the coarse coal fractions and return these fractions to the bowl for regrinding while the fines entrained in the air stream pass through the outlet 42 at the upper end of the classifier.

From this outlet 42 the air-pulverized coal mixture is conveyed through duct 44 to the inlet of the booster fan 46. This fan is effective to raise the pressure of this air-coal mixture to a value substantially above that existing in the furnace 10 with this air-coal mixture after thus having its pressure raised being conveyed through the distribution ducts 48 and to burners 13 from which it is introduced into the furnace.

The booster fan 46 and the bowl mill 26 are driven from the motor 50 with a drive shaft 52 extending through the housing of the bowl mill and connected with the drive for the fan.

Raw coal, which has been crushed to a suitable size for introduction into the pulverizing mill, is fed thereto by means of the feeder 34 with this feeder being of conventional construction including a suitable adjustable speed feeding wheel 54 illustrated generally in FIG. 1. Illustrative of feeders suitable for use with the invention are those disclosed in U.S. Patent 2,659,881 of November 17, 1953 and 2,305,128 of December 15, 1942.

In the pressurized firing system of the invention the entire system is operated above atmospheric pressure. In one system employing the present invention the following pressures prevail at one load: The pressure in duct 16 at the inlet of duct 21 is 21.4 inches of water; in duct 16 at the inlet of duct 22—18 inches; in mill 26 at the outlet of duct 24—12 inches; at the outlet of feeder 34—7 inches; at the outlet of classifier 40—2 inches; at the inlet of booster fan 46—1 inch; at the outlet of booster fan 42—23 inches; and in the furnace 10—11 inches.

The system of the invention is operated so that the temperature of the air-pulverized coal mixture passing from the classifier 42 is maintained at a generally predetermined and constant value and for this purpose the temperature responsive device 56 is employed and through controller 58 is effective to regulate the operating device 60 for the proportioning dampers 28 and 30, operating these dampers in a manner so that the aforesaid temperature is maintained.

The supply of coal or in other words the feed to the mill 26 is controlled in accordance with the desired output of the vapor generator and as an illustrative example this feeder may be controlled in response to the demand on turbine 12. In the illustrative organization there is provided a demand responsive device 62 which is connected with the regulating device 64 so that the feeder speed is regulated as desired. The supply of mill air to the mill 26 must be regulated as the feed is changed and for this purpose there is provided in the duct 24 adjustable damper 66 which is regulated through the regulating device 68. Because the pressure at the inlet of the mill 26 will vary with varying load and because the air requirement will vary with varying load as well as with different coals it is not possible to adjust this damper 66 directly from a signal from the load responsive device 62. The control for damper 66 involves obtaining a signal which is responsive to the rate at which pulverized coal and primary air are supplied to the furnace. This signal is compared with a signal from the demand responsive device 62 to obtain an error signal which is applied to the regulating device 68 with damper 66 being adjusted in accordance with this error signal to in turn vary the signal that is responsive to the rate of coal and primary air supply to reduce the error signal to zero. In the illustrative embodiment there is provided a pressure tap 70 in furnace 10 and a pressure tap 72 at the outlet of booster fan 46. These taps are connected to a pressure differential responsive device which provides a signal that represents the supply of primary air and pulverized coal to the furnace. This signal is in turn compared with a signal obtained from the demand responsive device 62 thereby producing a control or error signal which in turn operates the regulating device 68 to adjust damper 66.

Since the pulverized mill 26 operates at superatmospheric pressure and since the coal feeder also operates at superatmospheric pressure it is necessary to provide sealing air for the various journals that extend through the housings of these mills, such as the journals for the pivotally operated rollers, the journals for the feed wheel, and the journals for the rotating bowls. These pressure air seals are conventionally utilized in pressurized pulverizing mills. It is also necessary to provide a pressure air seal for the journal of the fan 46. The sealing air for these various seals is obtained from duct 16 with the sealing air pipe 74 being tapped into this duct upstream of air heater 18 at the zone of generally highest pressure in the duct and at a location where the pressurized air in duct 16 is cold and clean. This sealing air pipe 74 is connected with and supplies sealing air to the various air seals for the mill, the feeder and booster fan.

Reverse flow of air up through the feeder is prevented by means of maintaining a suitable column 76 of coal over the feeder. It will be appreciated that the higher the pressure in mill 26 at the outlet of feeder 34 the greater will be the column of coal necessary to provide an adequate coal seal. With the present invention wherein a relatively low pressure prevails in the mill 26 a relatively low column of coal will be required.

It will be appreciated that with the firing method and system of the present invention the air swept pulverizing mill is operated at a relatively low pressure and the pressurized air source which is necessary to supply secondary combustion supporting air in a system such as that to which the invention is utilized in an advantageous manner to provide optimum operating results and give a low overall power requirement. The booster fan which forms part of the system is operated at a generally constant temperature and at a lower temperature than in previously pressurized firing systems and the problem of air-sealing the various journals in the system is rendered much less difficult with the improved organization of the invention. As a result of the booster fan handling lower temperature air than in the prior pressurized systems wherein the fan was upstream of the mill the power requirement of the fan is decreased. Furthermore higher temperature air can be supplied to the mill thereby permitting higher moisture coals to be handled by the system since the drying capacity of the system may thus be increased.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In a firing system for firing a furnace at the pressure substantially above atmospheric the improved process comprising forming a pressurized air stream as a source of secondary combustion supporting air, heating said stream by passing it through a heating zone, creating a second stream of air by withdrawing air from the first air stream both before and after said zone and uniting the withdrawn streams into said second stream, conveying said second stream directly to and then through a coal pulverizing zone contacting the stream with pulverized coal thereby drying said coal and entraining pulverized coal in said stream, thereafter conveying said second stream with the coal entrained therein to a pumping zone and raising the pressure thereof to a value well above that in said furnace and introducing said stream with the entrained pulverized coal into the furnace and providing a seal for the pulverizing zone by conveying sealing air directly from the source of secondary air upstream of the heating zone to a location about the pulverizing zone.

2. In an organization wherein a furnace is fired with pulverized coal in a pressurized manner wherein the pressure in the furnace is well above atmospheric and wherein an air supply is provided by means of a forced draft fan which creates a stream of pressurized air for use as secondary combustion supporting air in the furnace and with this pressurized air stream passing over a suitable air heater, the improved pulverized coal firing process comprising creating a stream of mill air by withdrawing air from the first-mentioned stream both before and after the air heater and mixing the air thus withdrawn, regulating the air withdrawn at these locations to provide a mill air stream at a predetermined desired temperature, delivering this thus created mill air stream directly to an air swept coal pulverizer and at a pressure substantially above atmospheric, controllably feeding coal to said pulverizer, passing the mill air stream through the pulverizer and entraining coal therein, directing the mill air stream with the entrained pulverized coal from the pulverizer at a pressure well below that existing in the furnace and raising the pressure thereof to a pressure well above that in said furnace, thereafter directing this air stream with the entrained pulverized coal into said furnace and sealing the mill against leakage by delivering sealing air thereto directly from said pressurized air stream upstream of the air heater.

3. In combination a pressurized furnace, a pressurized firing system for the furnace including means creating a pressurized supply of secondary air of a pressure well above the superatmospheric pressure in the furnace and including a fan and an air heater through which said high pressure air is directed, an air swept pulverizing mill, means withdrawing air from said secondary air both before and after said air heater, mixing this withdrawn air and conveying it directly to said pulverizer, a booster fan receiving the output of the pulverizer and effective to raise the pressure thereof well above that in the furnace, and means conveying said mill output from said booster fan to the furnace and means supplying sealing air to the mill from the pressurized supply of secondary air upstream of the air heater.

References Cited in the file of this patent

UNITED STATES PATENTS

| | | |
|---|---|---|
| 2,716,002 | Craig | Aug. 23, 1955 |
| 2,831,637 | Mittendorf et al. | Apr. 22, 1958 |
| 2,841,125 | Falla | July 1, 1958 |